United States Patent [19]

Nance

[11] Patent Number: 4,712,464
[45] Date of Patent: Dec. 15, 1987

[54] STRINGED INSTRUMENT FINGER POSITIONING GUIDE

[76] Inventor: J. Kregg Nance, 1224 Ninth St., Santa Monica, Calif. 90401

[21] Appl. No.: 793,178

[22] Filed: Oct. 31, 1985

[51] Int. Cl.$^4$ ............................................... G10G 1/02
[52] U.S. Cl. .................................. 84/485 R; 84/453; 84/477 R
[58] Field of Search ..................... 84/314 R, 318, 453, 84/465, 471, 477, 485 R

[56] References Cited

U.S. PATENT DOCUMENTS

| | | | |
|---|---|---|---|
| 852,407 | 4/1907 | Galbraith | 84/314 R |
| 3,218,904 | 11/1965 | Hartman | 84/485 R |
| 3,616,723 | 11/1971 | Gullickson | 84/478 |

FOREIGN PATENT DOCUMENTS

| | | | |
|---|---|---|---|
| 162687 | 9/1905 | Fed. Rep. of Germany | 84/314 R |
| 1325933 | 3/1963 | France | 84/485 R |

Primary Examiner—Lawrence R. Franklin
Attorney, Agent, or Firm—Thomas A. Turner, Jr.; Seymour A. Scholnick

[57] ABSTRACT

A finger positioning guide includes a flat surface positionable between the neck and strings of a stringed instrument to present sets of uniformly colored spots beneath certain of the strings at predetermined distances along the neck. The flat surface is positioned in relation to the neck and the strings by a slot or a plurality of slots adopted for engaging frets and the nut. An edge limiting device, appended to the surface to comprise the guide and further position it in relation to the neck, may include a clamp shape clamping the guide to the neck.

5 Claims, 5 Drawing Figures

STRINGED INSTRUMENT FINGER POSITIONING GUIDE

BACKGROUND OF THE INVENTION

1. Field of the Invention

The present invention relates to the art of stringed instrument instruction, and more particularly to visual guides for assisting in the positioning of fingers on a stringed instrument neck.

2. Description of the Prior Art

Stringed instruments, such as guitars, ukuleles, banjos, and similar instruments usually are comprised of an extended neck having a plurality of strings stretched tightly along the face, but slightly spaced from the neck. Different chords or notes are audibly created by strumming, glancing, or picking the strings with one hand, or a bow or like instrument, while fingers of the other hand depress certain of the strings against the neck. The neck frequently has frets positioned at spaced intervals along the longitudinal length of the neck. The frets comprise longitudinally transverse bars raised from the finger board surface so that when a string is depressed between two frets, the depressed string will contact the frets on either side of the point of depression, to change the harmonic vibration of the string and thus contribute to the audible chord.

Each chord will require the depression of a set of strings at various longitudinal positions along the string next to the neck. Anywhere from one to four such string depressions may be required to produce a chord. Learning to play such a stringed instrument requires fundamentally, therefore, a learning of which strings, and at what points along the length of the neck such depressions must be made in order to create the audible chord.

In the past, certain guides and assists have been taught to aid in this learning process. For example, in U.S. Letters Pat. No. 4,286,495 to Roof, an electrically powered lighting system having an individual light recessed within the neck under each string in each fret is described. A pre-programed switching circuit energizes a set of such lights to illuminate the string-fret combination to be depressed in order to generate the desired chord.

In U.S. Letters Pat. No. 2,225,613 to Alyn, the neck is specially designed so that it is transparent and has a slot or hollow space for receiving a specially encoded strip the code of which is seen through the neck. Similarly, U.S. Letters Pat. No. 3,153,970 to Mulchi describes an encoded flat card visually positioned between the the frets on the neck and the strings. The fingers are first positioned, and the card is then removed prior to play.

In U.S. Letters Pat. No. 4,331,059 to Marabotto mechanical enclosures for completely enclosing linear sections of the neck and the strings have been described where a plurality of depressible shapes are connected to a button or buttons on the outside of the enclosure. In order to depress one to four strings necessary to create an audible chord, one need only to depress a button or buttons on the outside of the enclosure to which button or buttons the shapes on the inside of the enclosure are mechanically linked. Alphabetical guides are given adjacent the outside, single buttons, further. Yet again, a plurality of varied and contrasting colored sets of printed numbers within a circle have been taught having adhesive provided on the back. A selection of several of the identically colored numbers in a set can be adhered to the neck of the stringed instrument between the neck and the strings at the longitudinal or linear points along the neck, and underneath the individual string where it must be depressed in order to create its share of the chordal note. See U.S. Letters Pat. No. 1,699,380 to Stewart. Such an arrangement, as may be appreciated, requires some initial knowledge or instruction of precisely which strings, and at what points along the linear length of the neck must be depressed, and then the precise positioning of the adhesively backed numbers must be made.

It has long been desired to provide simple, integral and single unit devices which assist in the identification of the strings and the linear points along the neck of the stringed instrument where depressions must be made in order to create audible chord sounds. It is further desired to have such a single, integral device which is easily removed and reinserted during the learning process so as to assist the student of the stringed instrument in remembering the chordal positions, yet is easily positioned on the stringed instrument with accuracy and firmness, while not preventing contact between the fret and the strings. It is desired yet further to provide a stringed instrument chord learning guide which is encoded such as with colors in order to assist those with special and limited learning capability who might respond to coding as opposed to alphanumeric communicative instructions. It has long been sought to provide such a chord learning device that does not require a specially constructed stringed instrument, but rather adapts to existing constructions of stringed instrumentation.

SUMMARY

In brief, in accordance with one aspect of the present invention, a finger positioning guide for stringed instruments is described for use on stringed instruments having a neck and a plurality of strings extending along and spaced from an elongated neck and having a nut and a plurality of frets positioned at predetermined intervals along the linear neck. The guide is described as having a flat surface capable of being positioned between the strings and the neck, and accurately positioned by virtue of a slot adapted to fit around one fret, or a plurality of slots adapted to fit around a plurality of frets on the neck. Further location positioning is accomplished by a perpendicular or clamping appendage depending from the flat surface to hold the guide longitudinally in place on the neck. The instrument is capable of being played with full functional interaction of the frets with the strings while the guide remains in place thereon.

The flat surface is described as having for each chord a set of identically colored spots which contrast to the color of the flat surface. The spots are carefully positioned on the flat surface so that when the flat surface is accurately positioned in relation to the proper frets on the stringed instrument's neck, the spots are seen underneath a particular string at a linear position along the longitudinal length of the neck at a point on the string which must be depressed in order to create an audible chord sound. A plurality of chords can be represented on a single flat surface where the spots for each chord are identically colored but in contrasting color not only to the flat surface but also to spots representing other chords.

Other novel features which are believed to be characteristic of the invention, both as to organization and method of operation together with further objects and advantages thereof, will be better understood from the following detailed description considered in connection with the accompanying drawings in which a preferred embodiment of the invention is illustrated by way of example. It is to be understood, however, that the drawings are for the purpose of illustration and description only, and are not intended as a definition of limits of the invention.

DESCRIPTION OF THE PREFERRED EMBODIMENT

Figure 1:
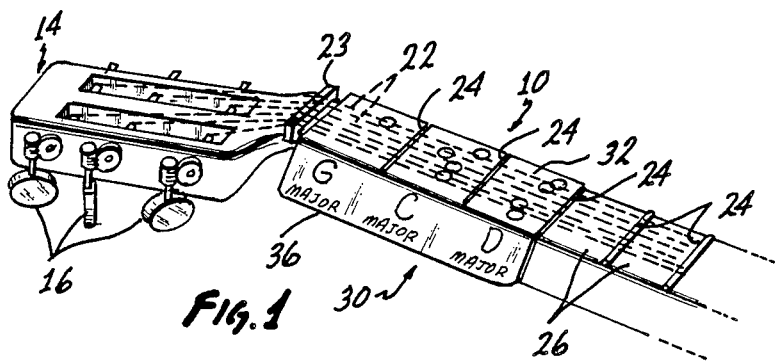
FIG. 1 is a perspective view of a portion of a neck of a stringed instrument having the preferred embodiment of the invention placed in relation thereto.
Figure 2:
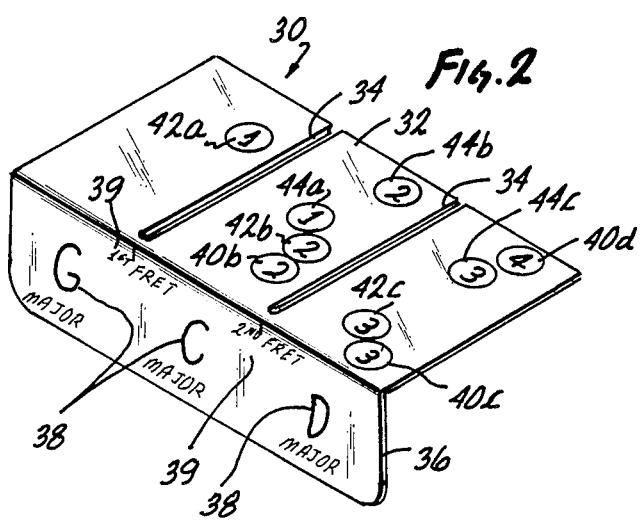
FIG. 2 is a perspective view of the preferred embodiment of the invention seen separately from its position on the stringed instrument of FIG. 1.
Figure 3:
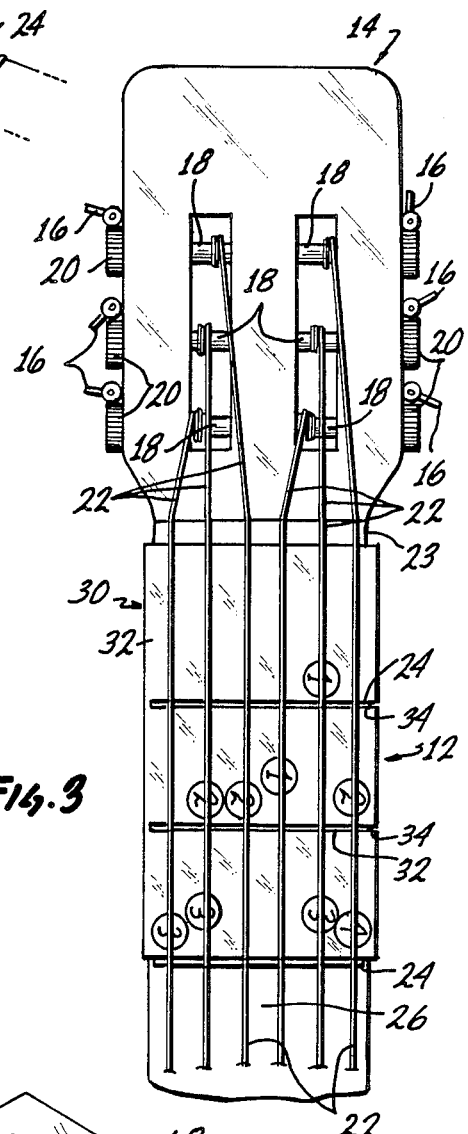
FIG. 3 is a plan view of the stringed instrument of FIG. 1 showing the preferred embodiment of the invention of FIGS. 1 and 2 in relation to the stringed instrument's neck.

The upper end of a six-stringed guitar 10, reference being had initially to FIGS. 1, 2 and 3 of the drawings is depicted showing a portion of the neck 12 and the head 14. The head 14 is comprised of tuning keys 16, one tuning key 16 for each string of the instrument. Each tuning keys 16 rotates a corresponding axle 18 through corresponding gearing 20. Each string 22 is attached to its own corresponding axle and tightened by rotating the axle by the tuning key 16 in accordance with usual tuning techniques. Those familiar with guitars and stringed instruments will recognize the nut 23 and the frets 24 positioned at pre-determined spaced intervals along the neck 12 to define fingerboard sections 26 therebetween.

As seen more clearly in FIG. 2, the positioning guide 30 comprises a flat surface 32 segregated into sections by slots 34. The slots 34 are shaped to receive the frets 24 when the guide 30 is positioned between the strings 22 and the neck 12. A positioning appendage 36 depends perpendicularly from the flat surface 32 to further act as a positioning element laterally positioning the surface 32 in relation to the strings 22. The slots 34 are closed at one end. The appendage 36 is marked with an alphabetical identification 38 of the chords represented by the spots on surface 32. Further, an identification 39 of the fret numbers is provided on the appendage 36 so that the guide 30 can be positioned correctly between the neck 12 and the strings 22.

Positioned on the surface 32 are spots representing finger depressing positions for depressing the strings 22 in order to create audible chord notes. When the surface 32 is positioned between the strings 22 and the neck 12, spots will be precisely positioned underneath strings at linear positions along the longitudinal direction of the neck 12, and within fingerboard sections 26. When the slots 34 are correctly positioned over the identified 39 frets 24, and the surface 32 is accurately positioned laterally by placing the appendage 36 against the side of the neck 12, the spots are correctly positioned in the correct fingerboard section and underneath the correct string in order to create a chordal sound. In the examples shown in FIGS. 1-3 of the drawings, each chord can be created by the depression of three strings at appropriate fingerboard sections. All of the spots for each separate chord are colored the same color, and are colored contrastingly to the spots for the other chords and to the surface 32. Furthermore, the G chord identification 38 is identically colored to its corresponding spots 40. The C chord identification 38 is colored to its corresponding spots 42. The D chord identification 38 is colored identically to its corresponding spots 44.

The guide 30 is adapted to be placed between the neck 12 and the strings 22 on the neck of the guitar 10 so that the slots 34 are positioned conterminously along their longitudinal sides to the proper frets 24 identified 39 on the appendage 36. The guide is slipped or inserted until the appendage 36 abuts the sidewall of the neck 12. If a person wishes to play a G Major chord, he must depress the strings 22 over the spots 40b, 40c and 40d, all having the same color to each other and to the "G" identification 38 on the appendage 36. Similarly for the chord of C Major, the strings 22 over the identically colored spots 42a, 42b and 42c must be depressed. To play the chord of D Major, press the strings 22 over the identically colored spots 44a, 44b, 44c.

The spots 40, 42, 44 are numbered with the integers either "1", "2", "3", or "4", all integer representing a correspondingly identified finger of the person depressing the strings and playing the instrument. Thus, the spots corresponding to the playing of the chord of G Major are numbered "2" 40b, "3" 40c and "4" 40d, to indicate that the spots should be depressed by, correspondingly, the second, third and fourth fingers of the hand holding the neck 12.

Figure 4:
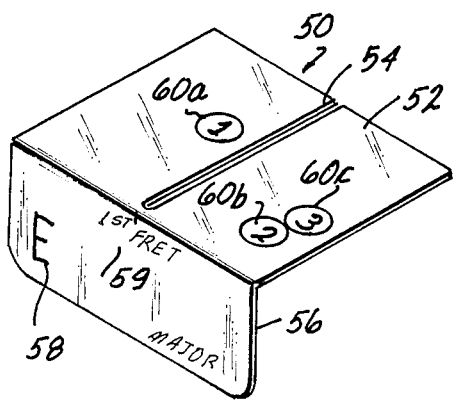
FIG. 4 is a perspective view on an alternative embodiment of the present invention showing the guide for a single chord.

In FIG. 4, an alternative form of the preferred embodiment is shown. The positioning guide 50 comprises a flat surface 52 divided into sections by a slot 54, and a positioning appendage 56 perpendicularly depending from the surface 52. The slot 54 is designed to fit on the longitudinal sides of frets 24 and is closed at the end near or adjacent the appendage 56.

The positioning guide 50 has an identifying chord name 58 and an identifying fret number 59 printed on the appendage 56. Finger positioning spots 60a, 60b and 60c are printed on the surface 52. For proper placement of the guide 50, the sides of the slot 54 should be placed conterminously with the longitudinal sides of the first fret 24 of the guitar 12.

Figure 5:
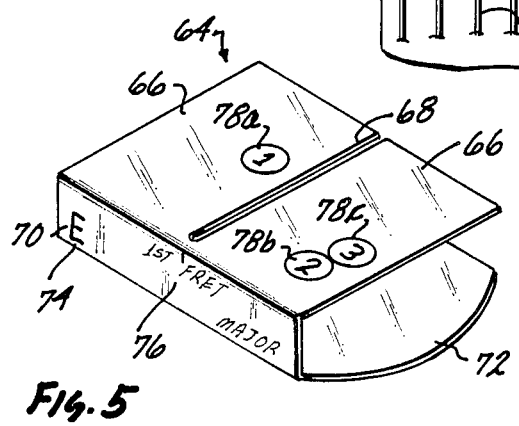
FIG. 5 is a perspective view of a second alternative embodiment of the present invention showing the guide having a clamping structure.

In FIG. 5, a second alternative form of the embodiment is shown. The positioning guide 64 comprises a flat surface 66 divided into sections by a slot 68. Depending perpendicularly from the surface 66 is appendage closing slot 68 and 70 having its continuing end 72 bent or shaped to conform to the curved shape of the back of the neck 12. The positioning guide 64 is formed or manufactured from resilient material so that when the flat surface 66 is positioned between the top of the neck 12 and the strings 22, and the slot 68 is correctly positioned on the appropriate fret, the bias of the spring action between the curved portion 72 and the flat surface 66 of the positioning guide 64 holds the positioning guide 64 onto the neck 12 of the instrument.

The positioning guide 64 similarly comprises chord name identification 74 and fret number identification 76, as in the positioning guide 50 of FIG. 4 for correctly positioning or placing the guide 64 onto the neck 12.

In operation, referring initially to the description of the first embodiment in FIGS. 1, 2 and 3, the positioning guide 30 is positioned on the neck 12 of the guitar 10 so that the flat surface 32 is positioned between the strings 22 and the upper face of the neck 12 of the guitar 10. The slots 34 have their sides positioned conterminously with the first fret and the second fret on the guitar neck 12. For playing the chord of C Major, for example, the player depresses the string 22 with his first finger of the spot 42a, uses his second finger to depress the string 22 over the spot 42b, and his third finger to depress the string 22 over the spot 42c. The spots 42a, 42b and 42c are all colored identically to each other and to the color of the identification of "C Major" 38, in order to aid those who have reading, but not color identification disabilities. Similarly for playing the chord of D Major, the player depresses the strings 22 above the spots 44a with his first finger, 44b with his second finger and 44c with his third finger, and strums the guitar 10.

The operation of the alternative embodiment of FIG. 4 operates similarly, except that the positioning guide 50 is used. The flat surface 52 is placed between the strings 22 and the face of the neck 12 of the guitar 10, so that the edges of the slot 54 are conterminous with the longitudinal edges of the first fret 24, as is identified 59 on the appendage 56. The player depresses the strings 22 over the spots 60a with his first finger, 60b with his second finger and 60c with his third finger, and strums the guitar 10. Again, the spots 60 are colored identically to each other and to the color of the identification 58 for the chord that will be strummed if the fingers and the positioning guide are correctly positioned.

In operation, the alternative embodiment of FIG. 5 is designed with a spring bias so as to firmly and more securely hold the positioning guide 64 onto the neck 12. The slot 68 is aligned with the correct fret identified by fret identification 76, and the flat surface 66 is slid beneath the strings 22 and on top of the face of the neck 12. The resilient material of the guide 64 allows the extended and curved shape portions 72 of the appendage 70 to snap over the curved exterior of the bottom of the neck 12 and, by the bias of the spring action of the appendage 70 with the surface 66, to securely hold the guide 64 onto the neck 12. The surface 66 has placed thereon a series of spots 78 of identical color, and having a finger number identification in each spot. In spot 78a, the identifiying finger number "1" indicates that it is to be the positioning guide for the first finger of the player. Similarly, the identifying number "2" of spot 78b identifies the spot as the correct depression point for the second finger of the player. Again, the identifying numeral "3" of spot 78c identifies the spot as the location where the third finger of the player is to depress this string. By properly placing the indicated fingers over the strings opposite the spots 78, the player will strum the chord of E as indicated by the chord identification 74.

The foregoing detailed description of my invention in several preferred embodiments, is illustrative of specific embodiments only. It is to be understood, however, that additional embodiments, such as, for example, several combinations of the foregoing described embodiments, may be perceived by those skilled in the art. The embodiments described herein, together with those additional embodiments are considered to be within the scope of the present invention.

I claim:

1. For use with a conventional fretted stringed musical instrument having a plurality of strings extending along and spaced above a longitudinally extended fretted fingerboard section of the instrument, a finger position guide selectively manually attachable to and removable from the neck of the instrument without mechanical modification or alteration of the conventional instrument for indicating finger impingement positions for performing at least one predetermined musical chord, said guide comprising:

(a) a plate having a shape adapted to be removably inserted to a predetermined position beneath the strings and on top of the longitudinally extended fretted fingerboard section of the neck of the musical instrument, said plate being slotted with at least one slot to receive at least one fret subtended thereby, so that said plate fits snugly on the fingerboard when inserted thereon and is laterally aligned and longitudinally positioned by the subtended frets;

(b) said plate having established on its surface a first plurality of colored spots of a first color, said first plurality of colored spots when said plate is inserted being positioned beneath the strings for indicating respectively corresponding finger impingement positions for playing a first musical chord; and, (c) positioning means for laterally positioning said plate on said fingerboard comprising an appendage depending from only one side side of said plate and making a corner therewith, said appendage being adapted to abut the side of the fingerboard when said plate is inserted thereon to serve as a lateral positioning stop therefor wherein all slots of said slotted plate are closed at one side of said plate adjacent said depending appendage and are open to the side of said plate opposite said depending appendage.

2. The finger position guide of claim 1 wherein said plate has established on its surface a second plurality of colored spots of a second color different from said first color indicating, when said plate is inserted, corresponding finger impingement positions for playing a second musical chord.

3. The finger position guide of claim 2 wherein said dependent appendage has at least two visible indicia established thereon, each indicia identifying a corresponding one of the first and second musical chords and being color coded with the same color as the corresponding plurality of spots which indicate finger impingement positions for the respectively corresponding chord.

4. The finger position guide of claim 1 wherein said appendage includes a resilient clip to resiliently affix said plate and appendage to the neck of said instrument.

5. The finger position guide of claim 1 wherein said guide is adapted to be inserted and removed from only one side of the fingerboard of the musical instrument, said plate being slideably insertable from said one side with its open ended slot receiving frets which align the plate and position the plate longitudinally and being insertable laterally until its dependent appendage abuts the fingerboard to position said plate laterally.

* * * * *